INVENTOR
HAROLD HILLIER
BY
Pennie, Davis, Marvin & Edmonds
ATTORNEYS

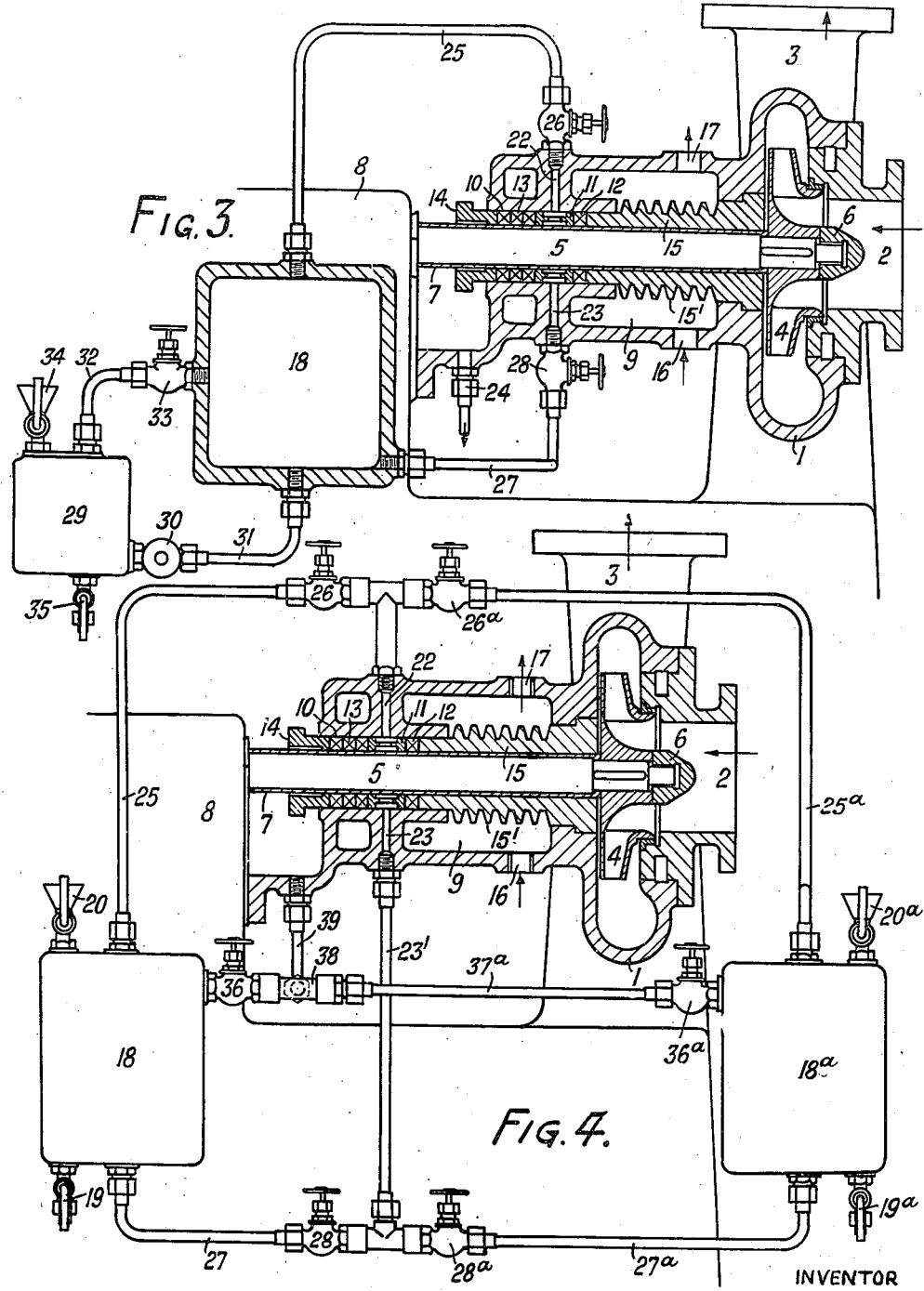

Patented Sept. 23, 1941

UNITED STATES PATENT OFFICE 2,257,011

2,257,011

LUBRICATING AND COOLING SYSTEM FOR THE STUFFING BOXES FOR PUMPS AND LIKE ENGINES

Harold Hillier, Cathcart, Glasgow, Scotland, assignor to G. & J. Weir, Limited, Cathcart, Glasgow, Scotland, a corporation of Great Britain Application October 23, 1940, Serial No. 362,474
In Great Britain November 1, 1939

6 Claims. (Cl. 286—19)

In the use of centrifugal and reciprocating pumps for feeding water to high pressure steam boilers difficulties are experienced with the stuffing boxes of such pumps due to the high pressure and temperature to which they are subjected.

Centrifugal and reciprocating pumps are also installed to create and maintain a forced circulation in boilers. In pumps for this purpose the stuffing box is subjected to the boiler pressure and to the high temperature of the water in circulation in the boiler, and difficulties are experienced with the stuffing box packing and with wear of the shaft or the protective sleeve thereon with which the packing is in contact.

As is understood, the life of the packing and of the shaft or shaft sleeve is dependent upon the packing being adequately and continuously lubricated. In addition, the heat which is generated by the friction between the packing and the shaft sleeve must be removed, since otherwise the heat causes increase of the shaft diameter and thus increases the pressure between the packing and the shaft sleeve, thereby causing a cumulative increase in the friction between the packing and the shaft sleeve until the packing is burnt or the sleeve is damaged to an extent such as to require renewal.

An object of the present invention is to reduce to a minimum the friction between the packing and the shaft sleeve by automatic maintenance of a continuous supply of a suitable lubricant, so that the heat generated by friction between the packing and shaft sleeve is reduced to a minimum and a maximum life of the packing and of the shaft sleeve is obtained.

It is known in connection with installations including a pump operating with hot water to provide a long stationary tube extending axially between the interior of the pump casing and the packing in the stuffing box, such tube being fitted as closely as practicable to the shaft running through the interior of the tube, whereby an annular restriction is afforded for flow of water from the pump through the stuffing box to the atmosphere. The exterior of such tube is usually subjected to a flow of cooling water, whereby water flowing through the annular restriction is cooled before it reaches the packing in the stuffing box.

According to the present invention there is associated with the pump or the like a receptacle for a suitable lubricating medium, hereinafter for convenience referred to simply as "oil," which receptacle is provided with an oil-replenishing connection and with a drain connection for the drainage of water from the receptacle. The receptacle communicates with the stuffing box of the pump, so that water from the stuffing box passes into the receptacle, wherein by reason of the difference in density between such water and the oil in the receptacle, the water displaces the oil upwardly and the oil thus displaced is forced by the pressure in the receptacle to traverse the stuffing box to the exterior thereof, and in so doing efficiently lubricates the surface of the packing within the stuffing box and the surface of the shaft or shaft sleeve with which the packing is in contact.

The receptacle may be integral with the stuffing box, or, alternatively, the receptacle may be separate from the stuffing box and connected thereto by suitable pipes, whereby water leaking into the stuffing box from the pump passes to the bottom of the receptacle and displaces oil upwardly from the top of the receptacle into a lantern ring provided in the stuffing box, so that the oil so displaced flows outwardly through the stuffing box and thus lubricates the shaft packing.

The oil within the receptacle is subject to the pressure prevailing in the pump casing. In order that the receptacle may be replenished with oil while the pump is in operation, there may be provided a filling chamber which is connected by piping with the receptacle. This chamber is provided with an oil-replenishing connection, a water drain connection, and with isolating valves or cocks in the piping connecting the chamber with the receptacle. The pipe connections to the receptacle are so arranged that the bottom of the receptacle is connected to the bottom of the chamber, and the top of the chamber is connected to a higher point of the receptacle. When it is desired to replenish the receptacle with oil, the chamber is filled with oil through the oil-filling connection, and the valves controlling the two pipe connections to the receptacle are opened. Due to the difference in density between the oil in the chamber and any water contained in the receptacle, the water flows from the receptacle into the chamber, and the oil is displaced from the chamber into the receptacle, after which the valves may be closed and the water discharged from the chamber to atmosphere through the drain connection.

The oil leaking outwardly from the stuffing box may be drained into a suitable sump and used again in the receptacle.

There may be provided two receptacles which are so pipe-connected to the stuffing box and to the sump that, while one receptacle is serving as a collector for the oily drainage escaping from the stuffing box to the sump, the other receptacle is in service supplying oil to the stuffing box. The valve connections are so arranged that, when the receptacle which is collecting oil from the sump is full, the requisite valves may be operated to enable such receptacle to deliver oil to the stuffing box, and to enable the other receptacle to perform the duty of collecting oil from the sump.

In the accompanying drawings,

Fig. 3 is an axial section of a centrifugal pump with a separate oil receptacle provided with means for charging the receptacle while the pump is in operation.

Fig. 4 is an axial section of a centrifugal pump with two oil receptacles and piping connections so arranged that each receptacle functions alternatively as an oil collector and as a source of oil supply.

Figure 1:
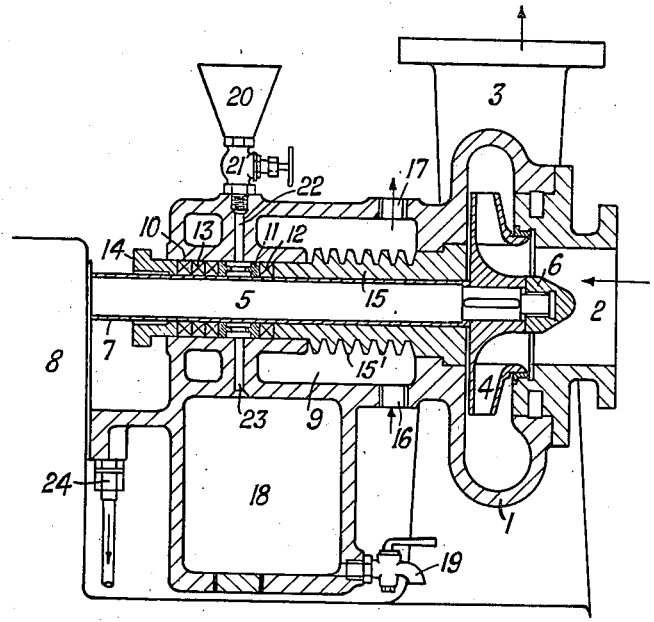
Fig. 1 is an axial section of a centrifugal pump with an oil receptacle arranged integral with the pump stuffing box.

Referring to Fig. 1, the pump casing 1 is provided with a suction branch 2 and a discharge branch 3. The impeller 4 of the pump is fixed on the shaft 5, and secured by a nut 6. The shaft 5 is encased in a renewable sleeve 7, the shaft 5 is maintained in central position by bearings in an adjacent bearing pedestal 8 which is only partly shown. Integral with the casing 1 is a stuffing box cooling chamber 9 in the outer end wall of which is a stuffing box 10 penetrated by the shaft 5 and provided with a gland 14 and with a lantern ring 11 interposed between an inner belt of packing 12 and an outer belt of packing 13, the outer belt of packing being interposed between the gland 14 and the lantern ring 11. The chamber 9 is provided with inlet and outlet connections 16, 17, so that cooling water may be supplied to the chamber and taken from the chamber. Extending through the interior of the chamber 9 is a renewable restriction tube 15 closely surrounding the shaft 5 and centered at its inner end in an opening in the rear wall of the casing 1 and, at its outer end, within the inner end of the stuffing box. The tube 15 is provided with external cooling fins 15' or serrations or the like which augment the cooling surface of the tube 15 exposed to the cooling water within the chamber 9. An annular clearance orifice is provided between the bore of the tube 15 and the shaft 5 (or the shaft sleeve 7), so that water may pass along said orifice, from the pump towards the stuffing box and be cooled in its passage along said orifice by giving up heat to the tube 15 and thus to the cooling medium surrounding the tube 15. This water flowing along the annular orifice passes the packing 12 and enters the interior space of the lantern ring 11, which latter space is in free communication with an oil receptacle 18 integral with the stuffing box and disposed below the shaft 5. The receptacle 18 is provided with a drain cock 19. An oil-filling funnel 20 with isolating cock 21 is fitted to a passage 22, 23, communicating with the lantern ring 11. A sump or well is provided between the chamber 9 and the shaft bearing pedestal 8 and is provided with a drain 24 whereby oil and water leaking past the packing 13 into the sump can be drained away to a suitable place or vessel. The receptacle 18, the interior space of the lantern ring 11, and the passage leading to the lantern ring are filled with oil supplied through the filling cock 21. When the pump is put into operation, the pressure prevailing within the casing 1 forces water from the pump along the annular restriction orifice between the restriction tube 15 and the shaft 5. This pressure flow of water passes the packing 12 into the interior space of the lantern ring 11, and, being heavier than the oil present, descends into the receptacle 18 and displaces oil from the lantern ring 11 forwardly through the packing 13 within the stuffing box, whence it leaks past the gland and descends into the sump.

As is understood, the use of oil as a lubricant between the packing and the shaft reduces friction to a minimum and thereby ensures a maximum useful life for the packing and the shaft sleeve. The packing 12 is provided to prevent the possibility of oil leaking back into the pump and is not subject to any material pressure difference between its inner and outer end faces. When the whole of the oil in the receptacle 18 has been discharged through the stuffing box, the water which has displaced the oil may be drained from the receptacle 18 and the receptacle 18 replenished with oil. The receptacle may be provided with a liquid level gauge to permit the water level within the receptacle to be readily ascertained.

A uniform supply of oil is thus automatically provided to lubricate the surfaces of the packing in contact with the shaft sleeve, whereby friction is reduced to a minimum and the life of the packing and shaft sleeve 7 is prolonged.

Figure 2:
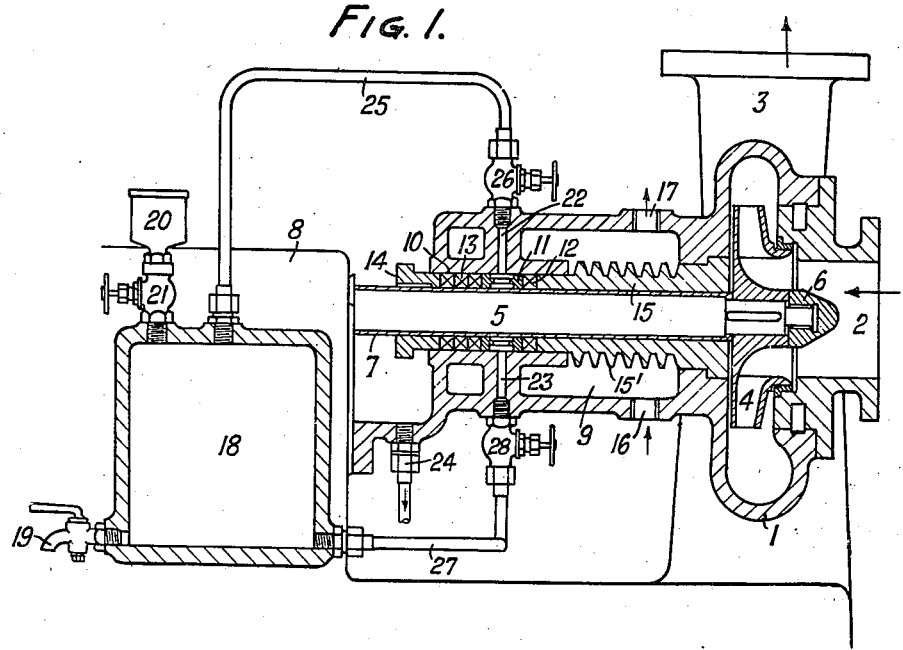
Fig. 2 is an axial section of a centrifugal pump with the oil receptacle arranged separately from the pump stuffing box.

Referring to Fig. 2, the oil receptacle 18 is arranged separately from the casing 1 and is connected to the stuffing box 10 by a pipe 25 which connects the top of the receptacle 18 to the passage 22. The pipe 25 is provided with an isolating valve 26. The bottom of the receptacle is connected by a pipe 27 to the passage 23 and is provided with an isolating valve 28. When the pump is in operation, pressure water from the pump flows along the annular orifice between the tube 15 and the shaft 5, and is cooled by the action of the cooling medium on the outer surface of the tube 15. The water passes the packing 12 and enters the interior space of the lantern ring 11. This space is full of oil which is of less density than the water leaking thereinto with the result that the water descends into the base of the receptacle 18 and displaces oil which flows by way of the pipe 25, valve 26 and passage 22 into the interior of the lantern ring. The pressure in the lantern ring 11 being almost the same as the pressure inside the pump, oil from the lantern ring 11 is forced past the packing 13 whence it passes outwardly past the gland 14 into the sump and is drained away by the drain 24 to a place of conservation ready to be used again in the receptacle 18. As water accumulates in the receptacle 18 it may be drained off by way of the cock 19 and replaced by oil through the filler device 20, 21. The arrangement ensures efficient and automatic lubrication for the packing in the stuffing box, whereby reducing friction to a minimum and ensuring maximum length of life for the packing and the shaft sleeve.

Referring to Fig. 3, there is associated with the receptacle 18 a separate filling chamber 29 the bottom of which is connected by way of a pipe 31 incorporating a valve 30 with the bottom of the receptacle 18, and the top of which is connected to a reasonably high point on the receptacle 18 by way of a pipe 32 fitted with a valve 33. An oil filling device 34 is provided on top of the chamber 29 and the bottom of the chamber is provided with a drain cock 35. When it is desired to replenish the receptacle 18 with oil, the valves 30 and 33 are closed, the oil filling chamber 29 is filled with oil by way of the filling device 34, the filling device 34 is then closed, and the valves 30 and 33 are opened. Oil rises into the receptacle 18 by way of the pipe 32 and water passes from the receptacle 18 to the chamber 29 by way of the pipe 31. The valves 30 and 33 are then closed and the filling device 34 opened, when the chamber may be drained of water by opening the drain cock 35. This arrangement permits the receptacle 18 to be charged at any time while the pump is in operation. The operation of the receptacle is as already described with reference to Fig. 2.

Referring to Fig. 4, each of two receptacles 18, 18a is fitted with a filling cock 20 or 20a and a drain cock 19 or 19a. The bottoms of the receptacles are connected by way of pipes 27, 27a fitted with valves 28, 28a with a pipe 23' leading to the underside of the lantern ring 11 in the stuffing box, and the tops of the receptacles are connected by way of pipes 25, 25a fitted with valves 26, 26a with the passage 22 leading to the top of the lantern ring 11. Connections are also provided from the oil receptacles by way of valves 36 and 36a, pipe 37a, branch piece 38 and pipe 39 to the gland well. When the receptacle 18 is being used for supplying oil to the lantern ring 11, the receptacle 18a is being used to collect oil draining from the gland well by way of the drain connection 39 and vice versa. When the receptacle 18 is being used for the supply of oil, the filling device 20 and the drain cock 19 are closed, valves 26 and 28 are opened while valve 36 is closed, the receptacle 18a operating as a collecting chamber as the valves 26a and 28a are closed while the valve 36a is open. Oil displaced from the receptacle 18 into the lantern ring 11 by the water flowing through the passage 23, valve 28 and pipe 27 will flow past the packing 13 to the gland well whence it drains by way of pipe 39, pipe 37a and valve 36a to the receptacle 18a. Ultimately the whole of the oil in the receptacle 18 will be transferred to the receptacle 18a when the receptacle 18 can be placed on to oil supply service to the lantern ring 11 by opening and closing the necessary connections, while the receptacle 18 is placed on to oil collecting duty by first draining the said receptacle of water by way of the cock 19 and then closing and opening the appropriate connections to enable the receptacle to collect oil as it is drained through the drain 39.

Although the invention has been described with particular reference to centrifugal pumps, and more particularly to centrifugal pumps for dealing with hot water it will be understood that the invention is applicable to pumps in general and like engines adapted for handling cold and/or hot water and other liquids.

I claim:

1. A lubricating system for the stuffing box of a water pump or like engine comprising, in combination with a shaft thereof which is surrounded by the stuffing box, a receptacle for water and oil, positioned at least in part below the level of the stuffing box, means for conducting oil from the top of the receptacle to the stuffing box, means for conducting water from the stuffing box to the receptacle to displace by gravity oil in the receptacle and to cause the oil to flow from the receptacle to the stuffing box.

2. A lubricating and cooling system for the stuffing box of a water pump or like engine comprising, in combination with a shaft thereof which is surrounded by the stuffing box, a sleeve surrounding said shaft and embraced by the stuffing box, a tube having cooling fins surrounding said sleeve with clearance permitting leakage of water from the engine to the stuffing box, a receptacle for water and oil positioned at least in part below the level of the stuffing box, means for conducting oil from the top of the receptacle to the stuffing box, means for conducting water from the stuffing box to the receptacle to displace by gravity oil in the receptacle and to cause the oil to flow from the receptacle to the stuffing box.

3. A lubricating system for the stuffing box of a water pump or like engine comprising, in combination with a shaft thereof which is surrounded by the stuffing box, a receptacle for water and oil separate from said stuffing box and positioned at least in part below the level of the stuffing box, means for conducting oil from the top of the receptacle to the stuffing box, means for conducting water from the stuffing box directly to the bottom of the receptacle to displace by gravity oil in the receptacle and to cause the oil to flow from the receptacle to the stuffing box.

4. A lubricating and cooling system for the stuffing box of a water pump or like engine comprising, in combination with a shaft thereof, a sleeve surrounding said shaft and embraced by the stuffing box, a tube having cooling fins surrounding the sleeve with clearance permitting leakage of water from the engine to the stuffing box, a receptacle for water and oil separate from the stuffing box and positioned at least in part below the level of the stuffing box, a pipe for conducting oil from the top of the receptacle to the stuffing box, a pipe for conducting water from the stuffing box directly to the bottom of the receptacle to displace by gravity the oil in the receptacle to cause the oil to flow to the stuffing box, and isolating valves intercalated in said pipes.

5. A lubricating and cooling system as set forth in claim 4, in which the water and oil receptacle is associated with a filling chamber positioned at least in part below the level of the water and oil receptacle and is connected to the receptacle by a water drainage connection at the bottom and by an oil filling connection at the top, and in which means are provided for the introduction of oil to the filling chamber and the drainage of water therefrom.

6. A lubricating system for the stuffing box of a water pump or like engine comprising, in combination with a shaft thereof which is surrounded by said stuffing box, two receptacles separate from the stuffing box for water and oil, each positioned at least in part below the level of the stuffing box, a pipe for conducting oil from the top of each of the receptacles to the stuffing box, a pipe for conducting water from the stuffing box to each of the receptacles to displace by gravity oil in the receptacles and to cause the oil to flow from the receptacles to the stuffing box, a gland well or sump for catching oil and water leaking past the stuffing box, pipes connecting the gland well or sump with both of the receptacles, and isolating valves in said pipes, whereby one receptacle can be operated on the lubricating service while the other receptacle is operating as a gland drainage well collector, the pipes and valves being so arranged that the duties of the receptacles can be reversed alternately.

HAROLD HILLIER.